United States Patent
Rao et al.

(10) Patent No.: US 12,480,112 B2
(45) Date of Patent: Nov. 25, 2025

(54) GLUTAMATE DECARBOXYLASE MUTANT WITH IMPROVED PH TOLERANCE AND USE THEREOF IN SYNTHESIS OF GAMMA-AMINOBUTYRIC ACID

(71) Applicant: JIANGNAN UNIVERSITY, Wuxi (CN)

(72) Inventors: Zhiming Rao, Wuxi (CN); Jin Han, Wuxi (CN); Taowei Yang, Wuxi (CN); Meijuan Xu, Wuxi (CN); Xian Zhang, Wuxi (CN)

(73) Assignee: JIANGNAN UNIVERSITY, Jiangsu (CN)

( * ) Notice: Subject to any disclaimer, the term of this patent is extended or adjusted under 35 U.S.C. 154(b) by 75 days.

(21) Appl. No.: 18/542,109

(22) Filed: Dec. 15, 2023

(65) Prior Publication Data
US 2024/0110173 A1   Apr. 4, 2024

Related U.S. Application Data

(63) Continuation of application No. PCT/CN2022/076360, filed on Feb. 15, 2022.

(30) Foreign Application Priority Data

Jan. 25, 2022 (CN) .......................... 202210086048.3

(51) Int. Cl.
*C12N 9/88* (2006.01)
*C12N 1/21* (2006.01)
*C12N 15/60* (2006.01)
*C12P 13/00* (2006.01)

(52) U.S. Cl.
CPC .............. *C12N 9/88* (2013.01); *C12P 13/005* (2013.01); *C12Y 401/01015* (2013.01)

(58) Field of Classification Search
None
See application file for complete search history.

(56) References Cited

FOREIGN PATENT DOCUMENTS

| CN | 105296456 A | 2/2016 |
| CN | 106754850 A | 5/2017 |
| CN | 112391372 A | 2/2021 |
| CN | 114525268 A | 5/2022 |
| WO | 2015092576 A1 | 6/2015 |

OTHER PUBLICATIONS

Yu et al., C-terminal truncation of glutamate decarboxylase from Lactobacillus brevis CGMCC 1306 extends its activity toward near-neutral pH, Enz. Microbial Technol. 50, 2012, 263-69 (Year: 2012).*
Jiwen, Efficient biosynthesis of γ-aminobutyric acid by rationally engineering the catalytic pH range of a glutamate decarboxylase from Lactobacillus plantarum Chinese J. Biotechnol. 39, 2023, 2108-25. (Year: 2023).*
Uniprot, Accession No. G1FNX1, 2021, www.uniprot.org. (Year: 2021).*
Sun-Mi Shin et al., "Characterization of Glutamate Decarboxylase from Lactobacillus plantarum and Its C-Terminal Function for the pH Dependence of Activity" Journal of Agricultural and Food Chemistry, vol. 50, No. 62, pp. 12186-12193 (Dec. 31, 2014).
Ngoc Anh Thu Ho et al., "Expanding the active pH range of *Escherichia coli* glutamate decarboxylase by breaking the cooperativeness" Journal of Bioscience and Bioengineering, vol. 115 No. 2, 154-158, 2013 (Sep. 29, 2012).
Tan Xiao et al., Cloning and expressing of glutamate decarboxylase gene from Lactobacillus plantarum producing γ-aminobutyric acid[J]. Food Science, 2018, 39(18): 159-165 (Dec. 31, 2018).

* cited by examiner

*Primary Examiner* — Todd M Epstein
(74) *Attorney, Agent, or Firm* — SZDC Law PC

(57) ABSTRACT

The invention provides a glutamate decarboxylase mutant with improved pH tolerance and use thereof in synthesis of gamma-aminobutyric acid. The mutant is obtained by mutating glutamate decarboxylase having an amino acid sequence as shown in SEQ ID NO. 3. The enzyme activity of the mutant at pH 6.5 is improved to 178% of the original enzyme (SEQ ID NO. 3). The final yield of 1000 g of substrate fed in batches in a 5 L tank for 12 h is up to 688.13 g/L, which is about 52% higher than the productivity of the original glutamate decarboxylase. The final molar conversion rate can reach 98.2%. The invention not only broadens the enzyme activity of GAD under the optimum pH, but also broadens the enzyme activity of GAD under the neutral pH, and enhances the capability of the GAD to synthesize gamma-aminobutyric acid, and therefore is more suitable for industrial production.

10 Claims, 2 Drawing Sheets
Specification includes a Sequence Listing.

GLUTAMATE DECARBOXYLASE MUTANT WITH IMPROVED PH TOLERANCE AND USE THEREOF IN SYNTHESIS OF GAMMA-AMINOBUTYRIC ACID

This application is a Continuation Application of PCT/CN2022/076360, filed on Feb. 15, 2022, which claims priority to Chinese Patent Application No. 202210086048.3, filed on Jan. 25, 2022, which is incorporated by reference for all purposes as if fully set forth herein.

A Sequence Listing XML file named "10015_0140.xml" created on Dec. 15, 2023, and having a size of 39,710 bytes, is filed concurrently with the specification. The sequence listing contained in the XML file is part of the specification and is herein incorporated by reference in its entirety.

FIELD OF THE INVENTION

The invention belongs to the technical field of bioengineering, in particular to a glutamate decarboxylase mutant with improved pH tolerance and use thereof in synthesis of gamma-aminobutyric acid.

DESCRIPTION OF THE RELATED ART

GABA (gamma-aminobutyric acid) is a natural non-protein amino acid. As the main inhibitory neurotransmitter in the central nervous system of mammals, GABA has many important physiological functions such as anti-anxiety, lowering blood pressure, calming nerves, enhancing memory, preventing obesity and diabetes, etc., and therefore, has been widely used in medicine and food fields.

At present, the methods for preparing GABA are mainly divided into two types: chemical synthesis and biocatalysis. According to the different types of biocatalysts, biocatalysis methods may be further divided into a plant transformation method, a microbial transformation method, and an enzymatic method. There are mainly two chemical synthesis methods commonly used for preparing GABA. In one method, potassium phthalimide and γ-chlorobutyl cyanide are used as substrates and reacted at 180° C., and the product is hydrolyzed with concentrated sulfuric acid in reflux and then crystallized and purified to obtain GABA. In another method, pyrrolidone as a raw material is reacted at 121° C.-135° C., followed by a ring-opening hydrolysis with $Ca(OH)_2$ and $NH_4HCO_3$ to prepare GABA. Because of the harsh reaction conditions in industrial production and the easy production of toxic substances in the reaction process, the production of GABA is mainly by microbial enzymatic synthesis. Glutamate decarboxylase (GAD) can catalyze the decarboxylation of L-glutamic acid to obtain gamma-aminobutyric acid, and one proton is consumed in the reaction process.

GAD is widely present in bacteria, yeast and filamentous fungi, and mediates intracellular GABA synthesis. The preparation of GABA through transformation of microorganisms containing GAD is not limited by resources, environment and space, has become one of the most effective means for industrial production of GABA, and has attracted widespread attention. At present, the optimum pH of GAD in nature is generally 4.0 to 5.0, and the enzyme activity drops sharply at neutral pH. In the process of natural fermentation or transformation of microorganisms, the catalytic activity of bacteria often decreases with the increase of pH value caused by GABA accumulation in the fermentation broth, resulting in a low substrate conversion rate. Therefore, broadening the pH range of glutamate decarboxylase can help improve the substrate conversion rate.

SUMMARY OF THE INVENTION

An object of the invention is to provide a glutamate decarboxylase mutant with improved pH tolerance and use thereof in synthesis of gamma-aminobutyric acid, where the enzyme activity is improved under partial neutral conditions, and the conversion efficiency for preparing gamma-aminobutyric acid can be improved.

According to the technical scheme of the invention, the glutamate decarboxylase mutant with improved pH tolerance is obtained by mutating glutamate decarboxylase having an amino acid sequence as shown in SEQ ID NO. 3 in any of the following ways:
(1) mutating serine at position 24 to arginine, with an amino acid sequence as shown in SEQ ID NO. 7;
(2) mutating serine at position 24 to arginine, and mutating aspartic acid at position 88 to arginine, with an amino acid sequence as shown in SEQ ID NO. 9;
(3) mutating serine at position 24 to arginine, and mutating tyrosine at position 309 to lysine, with an amino acid sequence as shown in SEQ ID NO. 11; and
(4) mutating serine at position 24 to arginine, mutating aspartic acid at position 88 to arginine, and mutating tyrosine at position 309 to lysine, with an amino acid sequence as shown in SEQ ID NO. 1.

Compared with GB 01-21 strain glutamate decarboxylase (with an amino acid sequence as shown in SEQ ID NO. 5, and a nucleotide sequence as shown in SEQ ID NO. 6), the glutamate decarboxylase as shown in SEQ ID NO. 3 has four amino acid residue mutations, namely, mutation of proline at position 72 to threonine, mutation of alanine at position 154 to threonine, mutation of methionine at position 185 to valine, and mutation of leucine at position 412 to phenylalanine.

A nucleotide sequence of a gene encoding the glutamate decarboxylase as shown in SEQ ID NO. 3 is as shown in SEQ ID NO. 4.

A second aspect of the invention provides a gene encoding the glutamate decarboxylase mutant with improved pH tolerance.

Preferably, a nucleotide sequence of the gene is as shown in SEQ ID NO. 2, SEQ ID NO. 8, SEQ ID NO. 10, or SEQ ID NO. 12.

Specifically, a nucleotide sequence of a gene encoding the glutamate decarboxylase mutant having an amino acid sequence as shown in SEQ ID NO. 1 is as shown in SEQ ID NO. 2. A nucleotide sequence of a gene encoding the glutamate decarboxylase mutant having an amino acid sequence as shown in SEQ ID NO. 7 is as shown in SEQ ID NO. 8. A nucleotide sequence of a gene encoding the glutamate decarboxylase mutant having an amino acid sequence as shown in SEQ ID NO. 9 is as shown in SEQ ID NO. 10. A nucleotide sequence of a gene encoding the glutamate decarboxylase mutant having an amino acid sequence as shown in SEQ ID NO. 11 is as shown in SEQ ID NO. 12.

A third aspect of the invention provides a recombinant expression vector carrying the gene.

Preferably, pET-28a, PMA5, or PXMJ-19 is used as an original expression vector.

A fourth aspect of the invention provides a recombinant strain including the recombinant expression vector.

Preferably, *Escherichia Coli*, *Bacillus subtilis*, or *Corynebacterium glutamicum* is used as a host strain of the recombinant strain.

Preferably, the *Bacillus subtilis* includes *Bacillus subtilis* 168 (BS168).

A fifth aspect of the invention provides use of the glutamate decarboxylase mutant with improved pH tolerance, the gene, the recombinant expression vector, or the recombinant strain in synthesis of gamma-aminobutyric acid.

Preferably, gamma-aminobutyric acid is produced by using L-glutamic acid or L-sodium glutamate as a substrate and the glutamate decarboxylase mutant with improved pH tolerance or the recombinant strain as a catalyst.

Preferably, a 0.9% NaCl solution is used as a conversion system, no pH adjustment is required, and the product is easily extracted after conversion.

Preferably, the temperature is 25° C.-60° C.

The technical solution of the invention has the following advantages compared to the prior art:

By mutating glutamate decarboxylase, the invention not only broadens the enzyme activity of GAD under the optimum pH, but also broadens the enzyme activity of GAD under the neutral pH, and enhances the capability of the GAD to synthesize gamma-aminobutyric acid, and therefore is more suitable for industrial production.

Test results show that the enzyme activity of the glutamate decarboxylase mutant of the invention increased under different pH conditions compared with the parental glutamate decarboxylase, especially when the mutation mode was that serine at position 24 was mutated to arginine, aspartate at position 88 was mutated to arginine, and tyrosine residue at position 309 was mutated to lysine residue. The enzyme activity of the mutant at pH 6.5 is improved to 178% of the original enzyme (as shown in SEQ ID NO. 3). The final yield of 1000 g of substrate fed in batches in a 5 L tank for 12 h is up to 688.13 g/L, which is about 52% higher than the productivity of the original glutamate decarboxylase. The final molar conversion rate can reach 98.2%.

DETAILED DESCRIPTION OF THE PREFERRED EMBODIMENTS

Figure 1:
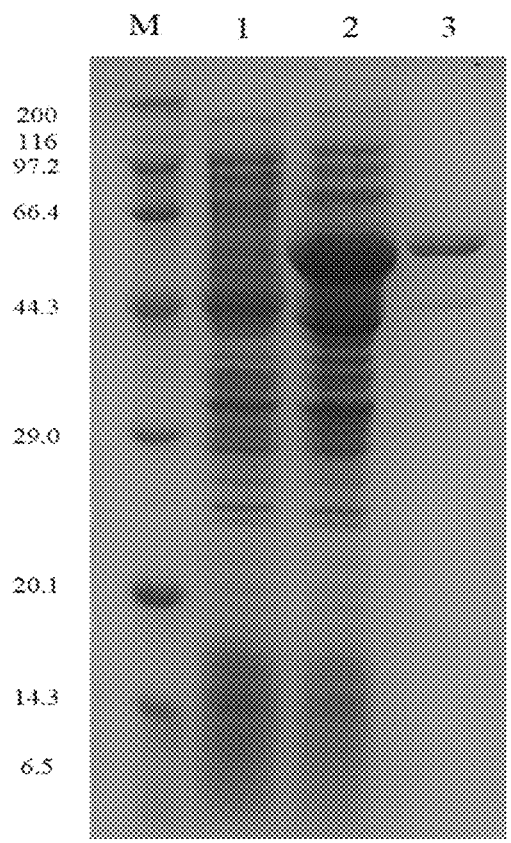
FIG. 1 is an SDS-PAGE diagram of a mutant strain.

The invention will be further described below in conjunction with the accompanying drawings and specific embodiments, so that those skilled in the art can better understand and implement the invention, but the embodiments described are not intended to limit the invention.

Example 1 Construction of a Recombinant Expression Vector Including a Gene Encoding a Glutamate Decarboxylase Mutant Mutant genes were constructed based on a fusion PCR method by using a recombinant plasmid pET-28a including a nucleotide sequence as shown in SEQ ID NO. 4 as a template and respectively using primers containing mutation sites to amplify gene fragments upstream and downstream the mutation sites. For genes with combined mutations, by using a single-point mutant plasmid as a template and using primers containing mutation sites, gene fragments upstream and downstream the mutation sites were amplified, and then a series of genes can be obtained by using the fusion PCR method. Details are given as follows.

| Primer | Gene |
|---|---|
| P1/P2, P3/P20 | lpgad$^{S24R}$ |
| P1/P4, P5/P20 | lpgad$^{D88R}$ |
| P1/P6, P7/P20 | Lpgad$^{L135K}$ |
| P1/P8, P9/P20 | Lpgad$^{E170R}$ |
| P1/P10, P11/P20 | Lpgad$^{H196R}$ |
| P1/P12, P13/P20 | Lpgad$^{A225K}$ |
| P1/P14, P15/P20 | Lpgad$^{Y309K}$ |
| P1/P16, P17/P20 | Lpgad$^{A359R}$ |
| P1/P18, P19/P20 | Lpgad$^{E417K}$ |
| P1/P2, P3/P4, P5/P20 | lpgad$^{S24R/D88R}$ |
| P1/P2, P3/P6, P7/P20 | lpgad$^{S24R/L135K}$ |
| P1/P2, P3/P8, P9/P20 | lpgad$^{S24R/E170R}$ |
| P1/P2, P3/P10, P11/P20 | lpgad$^{S24R/H196R}$ |
| P1/P2, P3/P12, P13/P20 | lpgad$^{S24R/A225K}$ |
| P1/P2, P3/P14, P15/P20 | lpgad$^{S24R/Y309K}$ |
| P1/P2, P3/P16, P17/P20 | lpgad$^{S24R/A359R}$ |
| P1/P2, P3/P18, P19/P20 | lpgad$^{S24R/E417K}$ |
| P1/P2, P3/P4, P5/P14, P15/P20 | lpgad$^{S24R/D88R/Y309K}$ |

| | | |
|---|---|---|
| P1 | (SEQ ID NO. 13): | ATGGCAATGTTATACGGTAAACACAAT |
| P2 | (SEQ ID NO. 14): | CTTAGGAAGATCATGTTGTTCGCGAGG |
| P3 | (SEQ ID NO. 15): | GGTGCGCCTCGCGAACAACATGATCTT |
| P4 | (SEQ ID NO. 16): | TCAGATTTCCGGATGGCATTCTTTCGC |
| P5 | (SEQ ID NO. 17): | TGCCATCCGGAAATCTGAGTACCCCCG |
| P6 | (SEQ ID NO. 18): | CATTGCTTTACCGCCTAACATACAAGC |
| P7 | (SEQ ID NO. 19): | AGGCGGTAAAGCAATGAAATTCGCCTG |
| P8 | (SEQ ID NO. 20): | AAACTTACGCCAGCAAACTTGATAGCC |
| P9 | (SEQ ID NO. 21): | TTGCTGGCGTAAGTTTTGTGTCTACTG |
| P10 | (SEQ ID NO. 22): | TAAGACACGGTTAACGTCAAGGACCAT |
| P11 | (SEQ ID NO. 23): | GTTAACCGTGTCTTAGACTACGTGGAC |
| P12 | (SEQ ID NO. 24): | ATCGAGTTTGGCTAGGTCGTCATATTG |
| P13 | (SEQ ID NO. 25): | CTAGCCAAACTCGATAAGGTCGTTACT |
| P14 | (SEQ ID NO. 26): | CCCACCTAATTTACTAACTTTGAAGAC |
| P15 | (SEQ ID NO. 27): | AAAGTTAGTAAATTAGGTGGGGAGTTG |
| P16 | (SEQ ID NO. 28): | CAGAGCGCGTGCCAGGTAGCGGGCAAC |
| P17 | (SEQ ID NO. 29): | CTGGCACGCGCTCTGGATAAAGTTGGT |
| P18 | (SEQ ID NO. 30): | TTGTTGTTTCAGATTAGCAGGGAAAGG |
| P19 | (SEQ ID NO. 31): | AATCTGAAACAACAAGTCATCCAACGA |
| P20 | (SEQ ID NO. 32): | TCAGTGTGTGAATAGGTATTTCTTAGG |

The expression plasmid pET-28a was enzymatically cleaved by the restriction endonuclease EcoR I/Hind III to obtain a linearized vector. A gene of interest was ligated to the linearized vector to construct a recombinant plasmid. The recombinant plasmid was transformed into *Escherichia coli* JM109 by chemical transformation, coated on an LB plate containing kanamycin, and incubated overnight at 37° C. Clones were randomly picked up, identified by colony PCR and verified by sequencing. Results show that the recombinant expression vector containing the gene encoding the glutamate decarboxylase mutant was successfully transformed into the cloning vector *Escherichia coli* JM109, and the recombinant plasmid was extracted from the bacterial solution with successful mutation as verified by sequencing, and stored in a refrigerator at −20° C. The sequencing work was completed by Suzhou Genwiz Biotechnology Co., Ltd.

Example 2 Expression and Purification of GAD Mutant in *Escherichia coli* BL21

The recombinant plasmid pET-28a containing the mutant gene was transformed into *Escherichia coli* BL21 by chemical transformation. After the recombinant *Escherichia coli* was induced at 16° C. for 12 h, homogenized bacterial cells were collected by centrifugation. Protein purification was carried out by nickel column. The purified enzyme was added with 10% glycerol and stored at 4° C. for later use. The purified enzyme was analyzed by SDS-PAGE. The results of *E. coli* BL21/pET-28a-lpgad$^{S24R/D88R/Y309K}$ are shown in FIG. 1, where M represents protein Marker; lane 1 represents pET28a; lane 2 represents the supernatant of the lpgad$^{S24R/D88R/Y309K}$ mutant; and lane 3 represents the purified lpgad$^{S24R/D88R/Y309K}$ mutant. Results show that a pure recombinant glutamate decarboxylase mutant as determined by agarose electrophoresis was obtained.

Figure 2:
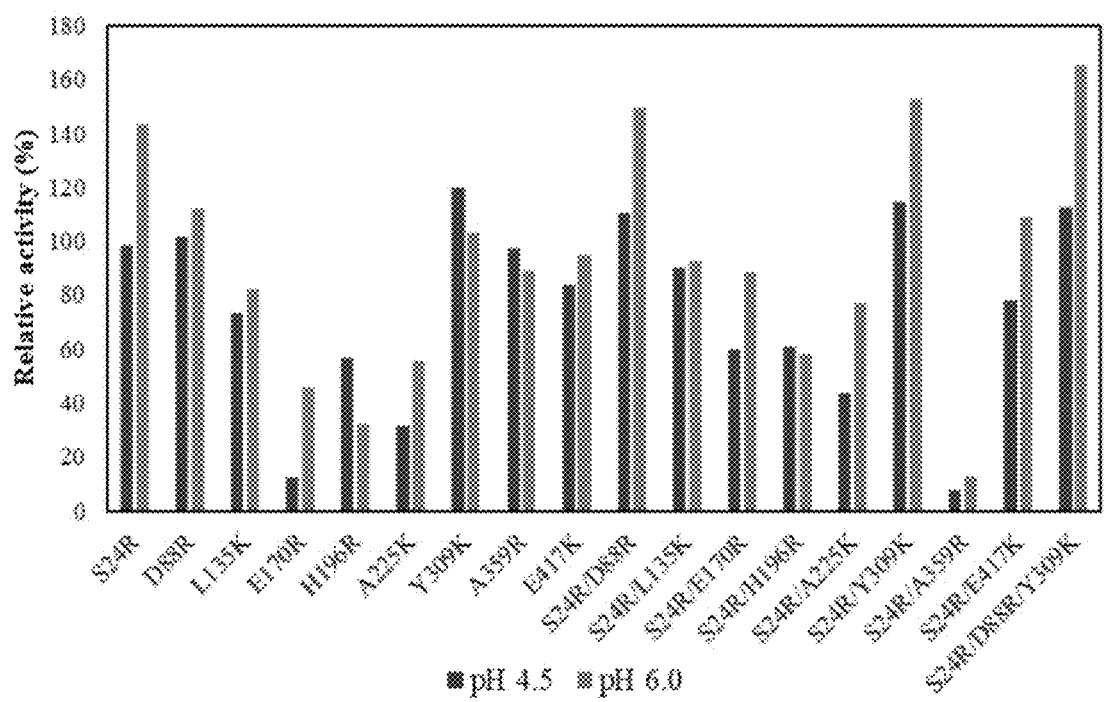
FIG. 2 shows relative enzyme activities of different mutants.

Example 3 Enzyme Activity Assay of Glutamate Decarboxylase and HPLC Analysis of Gamma-Aminobutyric Acid The relative enzyme activities of a series of purified enzymes (glutamate decarboxylase mutants) obtained in Example 2 when reacting with L-glutamic acid at optimum pH 4.5 and pH 6.0 were determined (where the enzyme activity of the enzyme as shown in SEQ ID NO. 3 was 100%), as shown in FIG. 2. Results show that: the relative enzyme activities of lpgad$^{S24R}$, lpgad$^{S24R/D88R}$, lpgad$^{S24R/Y309K}$, and lpgad$^{S24R/D88R/Y309K}$ were higher, and the relative enzyme activities at pH 6.0 were higher than those at pH 4.5.

Figure 3:
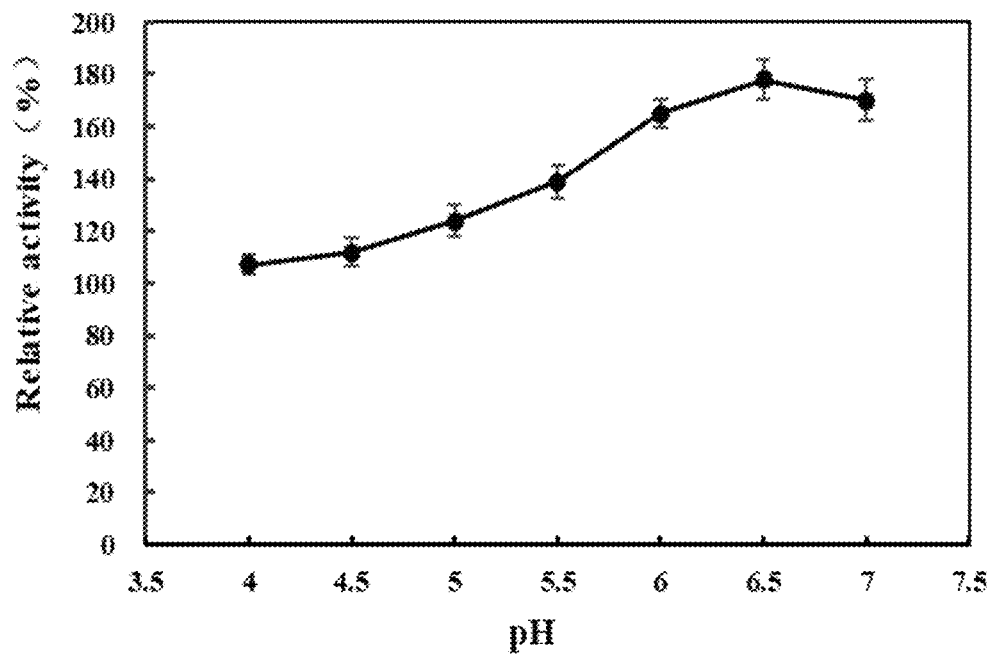
FIG. 3 shows relative enzyme activities of a mutant strain with three combined mutations at different pH.
Figure 4:
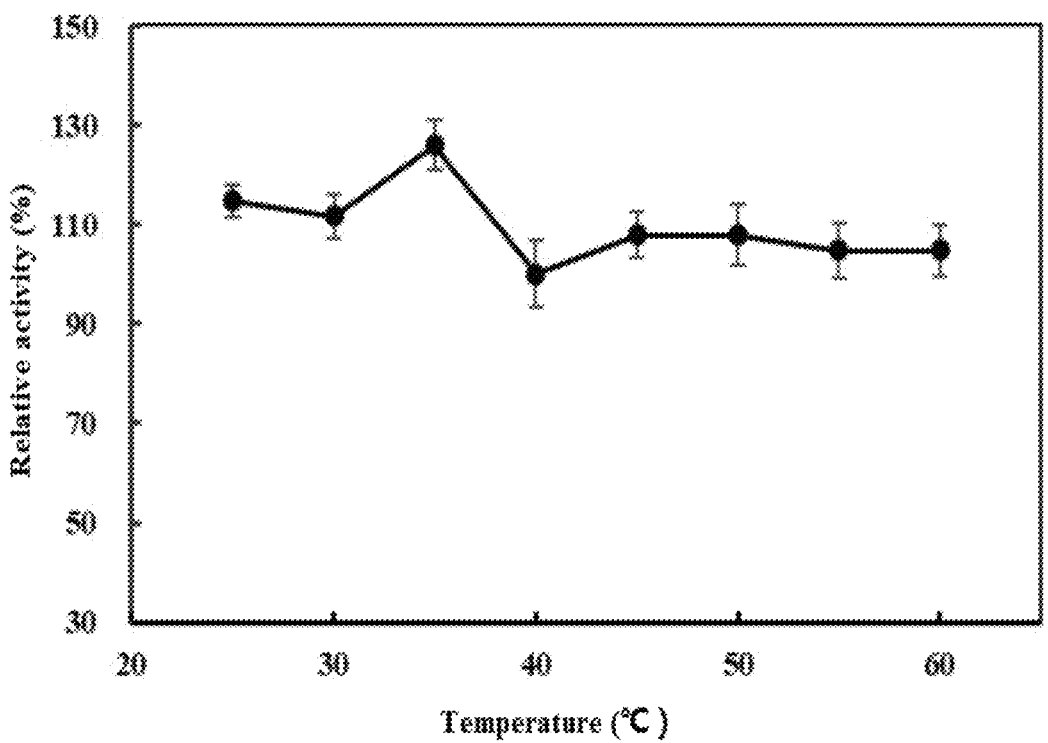
FIG. 4 shows relative enzyme activities of a mutant strain with three combined mutations at different temperatures.

The relative enzyme activities of the glutamate decarboxylase lpgad$^{S24R/D88R/Y309K}$ mutant at pH 4.0, 4.5, 5.0, 5.5, 6.0, 6.5 and 7.0 (as shown in FIG. 3, it can be seen that the relative enzyme activity was the highest at pH 6.5, and the relative enzyme activity was relatively high at pH 5.0-7.0) and at 25° C., 30° C., 35° C., 40° C., 50° C., 55° C. and 60° C. (as shown in FIG. 4) were also determined. After 30 minutes of reaction, samples were taken and the content of the product gamma-aminobutyric acid was determined by HPLC.

Definition of enzyme activity unit: One enzyme activity unit (U) is equal to the amount of enzyme needed to catalyze L-glutamic acid to produce 1 nmol gamma-aminobutyric acid at 30° C. in 1 min. The specific enzyme activity is the enzyme activity of 1 mg wet cell, measured in U/mg. The 1 mL reaction system for decarboxylation reaction between enzyme and substrate adopts the following concentrations: 0.01 mM PLP, and 100 mM L-sodium glutamate. Before the reaction, the buffer solution and enzyme solution were preheated at 30° C. for 5 min, then mixed evenly and reacted at 30° C. for 30 min, finally quickly boiled to terminate the reaction, and centrifuged. The resultant was diluted with 5% trichloroacetic acid (TCA) by a factor of 5. The protein was precipitated in a refrigerator at 4° C. for about 3 h, and then detected by HPLC.

HPLC: The reaction solution was diluted with 5% trichloroacetic acid (TCA) by a factor of 5. The protein was precipitated in a refrigerator at 4° C. for about 3 h, and centrifuged. The supernatant was filtered with a 0.22 μm membrane, and then injected. Chromatographic column: DinoSoil C18 (5 μL, 250 mm×4.6 mm), mobile phase: A: 0.1% aqueous formic acid solution; B: 100% acetonitrile; detector: UV Detector; detection wavelength: 360 nm; column temperature: 25° C.; sample size: 10 μL; flow rate: 1.0 mL/min. Process: 0-22 min: 15% B→50% B; 22-22.1 min: 50% B→15% B; 22.1-26 min: 15% B.

Example 4 Construction of Lpgad$^{S24R/D88R/Y309K}$ in *Bacillus subtilis*

The pET-28a-lpgad$^{S24R/D88R/Y309K}$ plasmid constructed in Example 1 was used as a template, and was amplified using the primer P1/P20 to obtain a gene of interest. The expression plasmid PMA5 was enzymatically cleaved by the restriction endonuclease BamH I/Mlu I to obtain a linearized vector. A gene of interest was ligated to the linearized vector to construct a recombinant plasmid PMA5-lpgad$^{S24R/D88R/Y309K}$. The recombinant plasmid was transformed into *Escherichia coli* JM109 by chemical transformation, coated on an LB plate containing ampicillin, and incubated overnight at 37° C. Clones were randomly picked up, and identified by colony PCR. Results show that the recombinant plasmid containing the gene encoding the glutamate decarboxylase mutant was successfully transformed into the cloning vector *Escherichia coli* JM109. Colonies determined to be positive were inoculated in a 5 mL LB liquid medium and cultured overnight at 37° C. The recombinant plasmid was extracted from the bacterial solution, and stored in a refrigerator at −20° C.

P1  (SEQ ID NO. 13):  ATGGCAATGTTATACGGTAAACACAAT

P20 (SEQ ID NO. 32):  TCAGTGTGTGAATAGGTATTTCTTAGG

The successfully constructed recombinant plasmid PMA5-lpgad$^{S24R/D88R/Y309K}$ was transformed into *Bacillus subtilis* BS168 by chemical transformation to construct a BS168/PMA5-lpgad$^{S24R/D88R/Y309K}$ recombinant strain, which was coated on an LB plate containing kanamycin and cultured overnight at 37° C. Clones were randomly picked up, and identified by colony PCR. The successfully transformed bacterial solution was added with glycerol and stored in a refrigerator at −80° C.

Example 5 Preparation of Gamma-Aminobutyric Acid from BS168/PMA5-lpgad$^{S24R/D88R/Y309K}$ Engineered Bacterium The BS168/PMA5-lpgad$^{S24R/D88R/Y309K}$ mutant engineered strain in Example 4 was used for transformation of L-glutamic acid substrate. In a 5 L tank with 1 L 0.9% NaCl solution as the buffer system, the bacterial count OD$_{600\ nm}$ was controlled to 16. 100 g/L L-glutamic acid was added in batches, and the reaction was carried out at 30° C. for 12 h. The final yield of 1000 g of substrate fed in batches using the lpgad$^{S24R/D88R/Y309K}$ engineered strain was up to 688.13 g/L, which was about 52% higher than that of the original enzyme, and the molar conversion rate was up to 98.2%. The results show that the catalytic efficiency of the mutant enzyme was significantly improved, providing broad industrial application prospects.

Apparently, the above-described embodiments are merely examples provided for clarity of description, and are not intended to limit the implementations of the invention. Other variations or changes can be made by those skilled in the art based on the above description. The embodiments are not exhaustive herein. Obvious variations or changes derived therefrom also fall within the protection scope of the invention.

What is claimed is:

1. A glutamate decarboxylase mutant with a broadened pH range, the decarboxylase mutant having one of the following mutations relative to the amino acid sequence as shown in SEQ ID NO: 3:
   (1) serine at position 24 mutated to arginine;
   (2) serine at position 24 mutated to arginine, and aspartic acid at position 88 mutated to arginine;
   (3) serine at position 24 mutated to arginine, and tyrosine at position 309 mutated to lysine; and
   (4) serine at position 24 mutated to arginine, aspartic acid at position 88 mutated to arginine, and tyrosine at position 309 mutated to lysine.

2. A gene encoding the glutamate decarboxylase mutant according to claim 1.

3. The gene according to claim 2, wherein the gene comprises the nucleotide sequence as shown in SEQ ID NO: 2, the nucleotide sequence as shown in SEQ ID NO: 8, the nucleotide sequence as shown in SEQ ID NO: 10, or the nucleotide sequence as shown in SEQ ID NO: 12.

4. A recombinant expression vector carrying the gene according to claim 2.

5. The recombinant expression vector according to claim 4, wherein pET-28a, PMA5, or PXMJ-19 is used as an original expression vector.

6. A recombinant strain comprising the recombinant expression vector according to claim 4.

7. The recombinant strain according to claim 6, wherein the recombinant strain is *Escherichia coli*, *Bacillus subtilis*, or *Corynebacterium glutamicum*.

8. The recombinant strain according to claim 7, wherein the recombinant strain is *Bacillus subtilis* 168.

9. A method for producing gamma-aminobutyric acid, comprising reacting glutamic acid or L-sodium glutamate to produce gamma-aminobutyric acid in the presence of the glutamate decarboxylase mutant according to claim 1.

10. The method of claim 9, wherein the reacting is at a pH of 6.5.

* * * * *

```
                            SEQUENCE LISTING

Sequence total quantity: 32
SEQ ID NO: 1            moltype = AA   length = 469
FEATURE                 Location/Qualifiers
source                  1..469
                        mol_type = protein
                        organism = unidentified
SEQUENCE: 1
MAMLYGKHNH EAEEYLEPVF GAPREQHDLP KYRLPKHSLS PREADRLVRD ELLDEGNSRL    60
NLATFCQTYM ETEAVELMKD TLRKNAIRKS EYPRTAEIEN RCVNIIANLW HAPDDEHFTG   120
TSTTGSSEAC MLGGLAMKFA WRKRAQAAGL DLNTHRPNLV ISAGYQVCWE KFCVYWDVDM   180
HVVPVDEQHM VLDVNHVLDY VDEYIIGIVG IMGITYTGQY DDLAALDKVV THYNHQHPKL   240
PVYIHVDAAS GGFYTPFIEP QLIWDFRLAN VVSINASGHK YGLVYPGVGW VVWRDRQFLP   300
PELVFKVSKL GGELPTMAIN FSHSAAQLIG QYYNFIRFGM DGYREIQTKT HDVARYLAAA   360
LDKVGEFKMI NNGHQLPLIC YQLAPREDRE WTLYDLSDRL LMNGWQVPTY PFPANLEQQV   420
IQRIVVRADF GMNMAHDFMD DLTKAVHDLN HAHIVYHHDA APKKYLFTH              469

SEQ ID NO: 2            moltype = DNA   length = 1410
FEATURE                 Location/Qualifiers
source                  1..1410
                        mol_type = other DNA
                        organism = synthetic construct
SEQUENCE: 2
atggcaatgt tatacggtaa acacaatcat gaagctgaag aatacttgga accagtcttt    60
ggtgcgcctc gggaacaaca tgatcttcct aagtatcggt taccaaagca ttcattatcc   120
cctcgagaag ccgatcgctt agttcgtgat gaattattag atgaaggcaa ttcacgactg   180
aacctggcaa cttttttgtca gacctatatg gaaaccgaag ccgttgaatt gatgaaggat   240
acgctgcgaa agaatgccat ccggaaatct gagtaccccc gcacggccga gattgaaaat   300
cggtgtgtga acattattgc caatctgtgg cacgcacctg atgacgaaca ctttacgggt   360
acctctacga caggctcctc tgaagcttgt atgttaggcg gtttagcaat gaaattcgcc   420
tggcgtaaac gcgctcaagc ggcaggttta gatctgaata cccatcgacc taacctcgtt   480
atttcggctg gctatcaagt ttgctgggaa aagttttgtg tctactggga cgttgacatg   540
cacgtggtcc cagtggatga gcaacacatg gtccttgacg ttaaccacgt cttagactac   600
gtggacgaat acattattgg tatcgtcggt atcatgggca tcacttatac cggtcaatat   660
gacgacctag ccgcactcga taaggtcgtt actcactaca atcatcagca tcccaaatta   720
ccagtctaca ttcacgttga cgcagcgtca ggtggcttct ataccccatt tattgagccg   780
caactcatct gggacttccg gttggctaac gtcgtttcga tcaacgcctc cgggcacaag   840
tacggtttag tttatcccgg ggtcggctgg gtcgtttcgc gtgatcgtca gttttaccg    900
ccagaattag tcttcaaagt tagtaaatta ggtggggagt gccgacaat ggcgatcaac    960
ttctcacata gtgcagccca gctcattgga caatactata atttcattcg ctttggtatg  1020
gacggttacc gcgagattca aacaaagact cacgatgttg cccgctacct ggcagccgct  1080
ctggataaag ttggtgagtt taagatgatc aataacggac accaactcc cctgatttgt  1140
taccaactag ccccgcgcga agatcgtgaa tggaccctt atgatttatc ggatcgccta  1200
ttaatgaacg gttggcaagt accaacgtat cctttcctg ctaatctgga acaacaagtc  1260
atccaacgaa tcgtcgttcg ggctgacttt ggcatgaata tggcccacga tttcatggat  1320
gacctgacca aggctgtcca tgacttaaac cacgcccaca ttgtctatca tcatgacgcg  1380
gcacctaaga aatacctatt cacacactga                                   1410

SEQ ID NO: 3            moltype = AA   length = 469
FEATURE                 Location/Qualifiers
source                  1..469
                        mol_type = protein
                        organism = unidentified
SEQUENCE: 3
MAMLYGKHNH EAEEYLEPVF GAPSEQHDLP KYRLPKHSLS PREADRLVRD ELLDEGNSRL    60
NLATFCQTYM ETEAVELMKD TLRKNAIDKS EYPRTAEIEN RCVNIIANLW HAPDDEHFTG   120
TSTTGSSEAC MLGGLAMKFA WRKRAQAAGL DLNTHRPNLV ISAGYQVCWE KFCVYWDVDM   180
HVVPVDEQHM VLDVNHVLDY VDEYIIGIVG IMGITYTGQY DDLAALDKVV THYNHQHPKL   240
PVYIHVDAAS GGFYTPFIEP QLIWDFRLAN VVSINASGHK YGLVYPGVGW VVWRDRQFLP   300
PELVFKVSYL GGELPTMAIN FSHSAAQLIG QYYNFIRFGM DGYREIQTKT HDVARYLAAA   360
LDKVGEFKMI NNGHQLPLIC YQLAPREDRE WTLYDLSDRL LMNGWQVPTY PFPANLEQQV   420
IQRIVVRADF GMNMAHDFMD DLTKAVHDLN HAHIVYHHDA APKKYLFTH              469

SEQ ID NO: 4            moltype = DNA   length = 1410
FEATURE                 Location/Qualifiers
source                  1..1410
                        mol_type = other DNA
                        organism = synthetic construct
SEQUENCE: 4
atggcaatgt tatacggtaa acacaatcat gaagctgaag aatacttgga accagtcttt    60
ggtgcgcctc tgaacaaca tgatcttcct aagtatcggt taccaaagca ttcattatcc   120
cctcgagaag ccgatcgctt agttcgtgat gaattattag atgaaggcaa ttcacgactg   180
aacctggcaa cttttttgtca gacctatatg gaaaccgaag ccgttgaatt gatgaaggat   240
```

```
acgctgcgaa agaatgccat cgacaaatct gagtacccc  gcacggccga gattgaaaat    300
cggtgtgtga acattattgc caatctgtgg cacgcacctg atgacgaaca ctttacgggt    360
acctctacga caggctcctc tgaagcttgt atgttaggcg gtttagcaat gaaattcgcc    420
tggcgtaaac gcgctcaagc ggcaggttta gatctgaatg cccatcgacc taacctcgtt    480
atttcggctg gctatcaagt ttgctgggaa aagttttgtg tctactggga cgttgacatg    540
cacgtggtcc cagtggatga gcaacacatg gtccttgacg ttaaccacgt cttagactac    600
gtggacgaat acattattgg tatcgtcggt atcatgggca tcacttatac cggtcaatat    660
gacgacctag ccgcactcga taaggtcgtt actcactaca atcatcagca tcccaaatta    720
ccagtctaca ttcacgttga cgcagcgtca ggtggcttct atacccatt  tattgagccg    780
caactcatct gggacttccg gttggctaac gtcgtttcga tcaacgcctc cgggcacaag    840
tacggtttag tttatcccgg ggtcggctgg gtcgtttggc gtgatcgtca gttttaccg     900
ccagaattag tcttcaaagt tagttattta ggtggggagt tgccgacaat ggcgatcaac    960
ttctcacata gtgcagccca gctcattgga caatactata atttcattcg ctttggtatg   1020
gacggttacc gcgagattca aacaaagact cacgatgttg cccgctacct ggcagccgct   1080
ctggataaag ttggtgagtt taagatgatc aataacggac accaactccc cctgatttgt   1140
taccaactag ccccgcgcga agatcgtgaa tggacccttt atgatttatc ggatcgccta   1200
ttaatgaacg gttggcaagt accaacgtat ccttcctg ctaatctgga acaacaagtc    1260
atccaacgaa tcgtcgttcg ggctgactt  ggcatgaata tggcccacga tttcatggat   1320
gacctgacca aggctgtcca tgacttaaac cacgcccaca ttgtctatca tcatgacgcg   1380
gcacctaaga aatacctatt cacacactga                                     1410

SEQ ID NO: 5            moltype = AA   length = 469
FEATURE                 Location/Qualifiers
source                  1..469
                        mol_type = protein
                        organism = unidentified
SEQUENCE: 5
MAMLYGKHNH EAEEYLEPVF GAPSEQHDLP KYRLPKHSLS PREADRLVRD ELLDEGNSRL     60
NLATFCQTYM EPEAVELMKD TLRKNAIDKS EYPRTAEIEN RCVNIIANLW HAPDDEHFTG    120
TSTTGSSEAC MLGGLAMKFA WRKRAQAAGL DLNAHRPNLV ISAGYQVCWE KPFCVYWDVDM   180
HVVPMDEQHM VLDVNHVLDY VDEYIIGIVG IMGITYTGQY DDLAALDKVV THYNHQHPKL    240
PVYIHVDAAS GGFYTPFIEP QLIWDFRLAN VVSINASGHK YGLVYPGVGW VVWRDRQFLP    300
PELVFKVSYL GGELPTMAIN FSHSAAQLIG QYYNFIRFGM DGYREIQTKT HDVARYLAAA    360
LDKVGEFKMI NNGHQLPLIC YQLAPREDRE WTLYDLSDRL LMNGWQVPTY PLPANLEQQV    420
IQRIVVRADF GMNMAHDFMD DLTKAVHDLN HAHIVYHHDA APKKYLFTH              469

SEQ ID NO: 6            moltype = DNA   length = 1410
FEATURE                 Location/Qualifiers
source                  1..1410
                        mol_type = other DNA
                        organism = synthetic construct
SEQUENCE: 6
atggcaatgt tatacggtaa acacaatcat gaagctgaag aatacttgga accagtcttt     60
ggtgcgccct tgaacaacc  tgatcttcct aagtatcggt taccaaagca ttcattatcc    120
cctcgagaag ccgatcgctt agttcgtgat gaattattag atgaaggcaa ttcacgactg    180
aacctggcaa ctttttgtca gacctatatg gaacccgaag ccgttgaatt gatgaaggat    240
acgctgcgaa agaatgccat cgacaaatct gagtaccccc gcacggccga gattgaaaat    300
cggtgtgtga acattattgc caatctgtgg cacgcacctg atgacgaaca ctttacgggt    360
acctctacga caggctcctc tgaagcttgt atgttaggcg gtttagcaat gaaattcgcc    420
tggcgtaaac gcgctcaagc ggcaggttta gatctgaatg cccatcgacc taacctcgtt    480
atttcggctg gctatcaagt ttgctgggaa aagttttgtg tctactggga cgttgacatg    540
cacgtggtcc caatggatga gcaacacatg gtccttgacg ttaaccacgt cttagactac    600
gtggacgaat acattattgg tatcgtcggt atcatgggca tcacttatac cggtcaatat    660
gacgacctag ccgcactcga taaggtcgtt actcactaca atcatcagca tcccaaatta    720
ccagtctaca ttcacgttga cgcagcgtca ggtggcttct atacccatt  tattgagccg    780
caactcatct gggacttccg gttggctaac gtcgtttcga tcaacgcctc cgggcacaag    840
tacggtttag tttatcccgg ggtcggctgg gtcgtttggc gtgatcgtca gttttaccg     900
ccagaattag tcttcaaagt tagttattta ggtggggagt tgccgacaat ggcgatcaac    960
ttctcacata gtgcagccca gctcattgga caatactata atttcattcg ctttggtatg   1020
gacggttacc gcgagattca aacaaagact cacgatgttg cccgctacct ggcagccgct   1080
ctggataaag ttggtgagtt taagatgatc aataacggac accaactccc cctgatttgt   1140
taccaactag ccccgcgcga agatcgtgaa tggacccttt atgatttatc ggatcgccta   1200
ttaatgaacg gttggcaagt accaacgtat ccttcctg ctaatctgga acaacaagtc    1260
atccaacgaa tcgtcgttcg ggctgactt  ggcatgaata tggcccacga tttcatggat   1320
gacctgacca aggctgtcca tgacttaaac cacgcccaca ttgtctatca tcatgacgcg   1380
gcacctaaga aatacctatt cacacactga                                     1410

SEQ ID NO: 7            moltype = AA   length = 469
FEATURE                 Location/Qualifiers
source                  1..469
                        mol_type = protein
                        organism = unidentified
SEQUENCE: 7
MAMLYGKHNH EAEEYLEPVF GAPREQHDLP KYRLPKHSLS PREADRLVRD ELLDEGNSRL     60
NLATFCQTYM ETEAVELMKD TLRKNAIDKS EYPRTAEIEN RCVNIIANLW HAPDDEHFTG    120
TSTTGSSEAC MLGGLAMKFA WRKRAQAAGL DLNTHRPNLV ISAGYQVCWE KPFCVYWDVDM   180
HVVPVDEQHM VLDVNHVLDY VDEYIIGIVG IMGITYTGQY DDLAALDKVV THYNHQHPKL    240
PVYIHVDAAS GGFYTPFIEP QLIWDFRLAN VVSINASGHK YGLVYPGVGW VVWRDRQFLP    300
PELVFKVSYL GGELPTMAIN FSHSAAQLIG QYYNFIRFGM DGYREIQTKT HDVARYLAAA    360
```

```
LDKVGEFKMI NNGHQLPLIC YQLAPREDRE WTLYDLSDRL LMNGWQVPTY PFPANLEQQV  420
IQRIVVRADF GMNMAHDFMD DLTKAVHDLN HAHIVYHHDA APKKYLFTH             469

SEQ ID NO: 8              moltype = DNA   length = 1410
FEATURE                   Location/Qualifiers
source                    1..1410
                          mol_type = other DNA
                          organism = synthetic construct
SEQUENCE: 8
atggcaatgt tatacggtaa acacaatcat gaagctgaag aatacttgga accagtcttt    60
ggtgcgcctc gcgaacaaca tgatcttcct aagtatcggt taccaaagca ttcattatcc   120
cctcgagaag ccgatcgctt agtcgtgat gaattattag atgaaggcaa ttcacgactg   180
aacctggcaa ctttttgtca gacctatatg gaaaccgaag ccgttgaatt gatgaaggat   240
acgctgcgaa agaatgccat cgacaaatct gagtaccccc gcacggccga gattgaaaat   300
cggtgtgtga acattattgc caatctgtgg cacgcacctg atgacgaaca ctttacgggt   360
acctctacga caggctcctc tgaagcttgt atgttaggcg gtttagcaat gaaattcgcc   420
tggcgtaaac gcgctcaagc ggcaggttta gatctgaata cccatcgacc taacctcgtt   480
atttcggctg gctatcaagt ttgctgggaa aagtttttcg tctactggga cgttgacatg   540
cacgtggtcc cagtgatga gcaacacatg gtccttgacg ttaaccacgt cttagactac   600
gtggacgaat acattattgg tatcgtcggt atcatgggca tcacttatac cggtcaatat   660
gacgacctag ccgcactcga taaggtcgtt actcactaca atcatcagca tcccaaatta   720
ccagtctaca ttcacgttga cgcagcgtca ggtggcttct atacccatt tattgagccg   780
caactcatct gggacttccg gttggctaac gtcgtttcga tcaacgcctc cgggcacaag   840
tacggtttag tttatcccgg ggtcggctgg gtcgtttggc gtgatcgtca gttttttaccg   900
ccagaattag tcttcaaagt tagttattta ggtgggagt gccgacaat ggcgatcaac    960
ttctcacata gtgcagccca gctcattgga caatactata atttcattcg ctttggtatg  1020
gacggttacc gcgagattca aacaaagact cacgatgttg cccgctacct ggcagccgct  1080
ctggataaag ttggtgagtt taagatgatc aataacggac accaactccc cctgatttgt  1140
taccaactag ccccgcgcga agatcgtgaa tggacccttt atgatttatc ggatcgccta  1200
ttaatgaacg gttggcaagt accaacgtat ccttttcctg ctaatctgga acaacaagtc  1260
atccaacgaa tcgtcgttcg ggctgactt ggcatgaata tggcccacga tttcatggat  1320
gacctgacca aggctgtcca tgacttaaac cacgcccaca ttgtctatca tcatgacgcg  1380
gcacctaaga aatacctatt cacacactga                                   1410

SEQ ID NO: 9              moltype = AA    length = 469
FEATURE                   Location/Qualifiers
source                    1..469
                          mol_type = protein
                          organism = unidentified
SEQUENCE: 9
MAMLYGKHNH EAEEYLEPVF GAPREQHDLP KYRLPKHSLS PREADRLVRD ELLDEGNSRL   60
NLATFCQTYM ETEAVELMKD TLRKNAIRKS EYPRTAEIEN RCVNIIANLW HAPDDEHFTG  120
TSTTGSSEAC MLGGLAMKFA WRKRAQAAGL DLNTHRPNLV ISAGYQVCWE KFCVYWDVDM  180
HVVPVDEQHM VLDVNHVLDY VDEYIIGIVG IMGITYTGQY DDLAALDKVV THYNHQHPKL  240
PVYIHVDAAS GGFYTPFIEP QLIWDFRLAN VVSINASGHK YGLVYPGVGW VVWRDRQFLP  300
PELVFKVSYL GGELPTMAIN FSHSAAQLIG QYYNFIRFGM DGYREIQTKT HDVARYLAAA  360
LDKVGEFKMI NNGHQLPLIC YQLAPREDRE WTLYDLSDRL LMNGWQVPTY PFPANLEQQV  420
IQRIVVRADF GMNMAHDFMD DLTKAVHDLN HAHIVYHHDA APKKYLFTH             469

SEQ ID NO: 10             moltype = DNA   length = 1410
FEATURE                   Location/Qualifiers
source                    1..1410
                          mol_type = other DNA
                          organism = synthetic construct
SEQUENCE: 10
atggcaatgt tatacggtaa acacaatcat gaagctgaag aatacttgga accagtcttt    60
ggtgcgcctc gcgaacaaca tgatcttcct aagtatcggt taccaaagca ttcattatcc   120
cctcgagaag ccgatcgctt agtcgtgat gaattattag atgaaggcaa ttcacgactg   180
aacctggcaa ctttttgtca gacctatatg gaaaccgaag ccgttgaatt gatgaaggat   240
acgctgcgaa agaatgccat ccggaaatct gagtaccccc gcacggccga gattgaaaat   300
cggtgtgtga acattattgc caatctgtgg cacgcacctg atgacgaaca ctttacgggt   360
acctctacga caggctcctc tgaagcttgt atgttaggcg gtttagcaat gaaattcgcc   420
tggcgtaaac gcgctcaagc ggcaggttta gatctgaata cccatcgacc taacctcgtt   480
atttcggctg gctatcaagt ttgctgggaa aagtttttcg tctactggga cgttgacatg   540
cacgtggtcc cagtgatga gcaacacatg gtccttgacg ttaaccacgt cttagactac   600
gtggacgaat acattattgg tatcgtcggt atcatgggca tcacttatac cggtcaatat   660
gacgacctag ccgcactcga taaggtcgtt actcactaca atcatcagca tcccaaatta   720
ccagtctaca ttcacgttga cgcagcgtca ggtggcttct atacccatt tattgagccg   780
caactcatct gggacttccg gttggctaac gtcgtttcga tcaacgcctc cgggcacaag   840
tacggtttag tttatcccgg ggtcggctgg gtcgtttggc gtgatcgtca gttttttaccg   900
ccagaattag tcttcaaagt tagttattta ggtgggagt gccgacaat ggcgatcaac    960
ttctcacata gtgcagccca gctcattgga caatactata atttcattcg ctttggtatg  1020
gacggttacc gcgagattca aacaaagact cacgatgttg cccgctacct ggcagccgct  1080
ctggataaag ttggtgagtt taagatgatc aataacggac accaactccc cctgatttgt  1140
taccaactag ccccgcgcga agatcgtgaa tggacccttt atgatttatc ggatcgccta  1200
ttaatgaacg gttggcaagt accaacgtat ccttttcctg ctaatctgga acaacaagtc  1260
atccaacgaa tcgtcgttcg ggctgactt ggcatgaata tggcccacga tttcatggat  1320
gacctgacca aggctgtcca tgacttaaac cacgcccaca ttgtctatca tcatgacgcg  1380
gcacctaaga aatacctatt cacacactga                                   1410
```

```
SEQ ID NO: 11          moltype = AA   length = 469
FEATURE                Location/Qualifiers
source                 1..469
                       mol_type = protein
                       organism = unidentified
SEQUENCE: 11
MAMLYGKHNH EAEEYLEPVF GAPREQHDLP KYRLPKHSLS PREADRLVRD ELLDEGNSRL    60
NLATFCQTYM ETEAVELMKD TLRKNAIDKS EYPRTAEIEN RCVNIIANLW HAPDDEHFTG   120
TSTTGSSEAC MLGGLAMKFA WRKRAQAAGL DLNTHRPNLV ISAGYQVCWE KFCVYWDVDM   180
HVVPVDEQHM VLDVNHVLDY VDEYIIGIVG IMGITYTGQY DDLAALDKVV THYNHQHPKL   240
PVYIHVDAAS GGFYTPFIEP QLIWDFRLAN VVSINASGHK YGLVYPGVGW VVWRDRQFLP   300
PELVFKVSKL GGELPTMAIN FSHSAAQLIG QYYNFIRFGM DGYREIQTKT HDVARYLAAA   360
LDKVGEFKMI NNGHQLPLIC YQLAPREDRE WTLYDLSDRL LMNGWQVPTY PFPANLEQQV   420
IQRIVVRADF GMNMAHDFMD DLTKAVHDLN HAHIVYHHDA APKKYLFTH              469

SEQ ID NO: 12          moltype = DNA   length = 1410
FEATURE                Location/Qualifiers
source                 1..1410
                       mol_type = other DNA
                       organism = synthetic construct
SEQUENCE: 12
atggcaatgt tataccggtaa acacaatcat gaagctgaag aatacttgga accagtcttt    60
ggtgcgcctc gcgaacaaca tgatcttcct aagtatcggt taccaaagca ttcattatcc   120
cctcgagaag ccgatcgctt agttcgtgat gaattattag atgaaggcaa ttcacgactg   180
aacctggcaa cttttttgtca gacctatatg gaaaccgaag ccgttgaatt gatgaaggat   240
acgctgcgaa agaatgccat cgacaaatct gagtaccccc gcacggccga gattgaaaat   300
cggtgtgtga acattattgc caatctgtgg cacgcacctg atgacgaaca ctttacgggt   360
acctctacga caggctcctc tgaagcttgt atgttaggcg gtttagcaat gaaattcgcc   420
tggcgtaaac gcgctcaagc ggcaggttta gatctgaata cccatcgacc taacctgtt   480
atttcggctg gctatcaagt tgctgggaa aagttttgtg tctactggga cgttgacatg   540
cacgtggtcc cagtggatga gcaacacatg gtccttgacg ttaaccacgt cttagactac   600
gtggacgaat acattattgg tatcgtcggt atcatgggca tcacttatac cggtcaatat   660
gacgacctag ccgcactcga taaggtcgtt actcactaca atcatcagca tcccaaatta   720
ccagtctaca ttcacgttga cgcagccgtca ggtggcttct atccccatt tattgagccg   780
caactcatct gggacttccg gttggctaac gtcgtttcga tcaacgcctc cgggcacaag   840
tacgtttag tttatcccgg ggtcggctgg gtcgtttggc gtgatcgtca gtttttaccg   900
ccagaattag tcttcaaagt tagtaaatta ggtgggagt gccgacaat ggcgatcaac    960
ttctcacata gtgcagccca gctcattgga caatactata atttcattcg ctttggtatg  1020
gacggttacc gcgagattca aacaaagact cacgatgttg cccgctacct ggcagccgct  1080
ctggataaag ttggtgagtt taagatgatc aataacggac accaactccc cctgatttgt  1140
taccaactag ccccgcgcga agatcgtgaa tggacccttt atgattatc ggatcgccta   1200
ttaatgaacg gttggcaagt accaacgtat cctttccctg ctaatctgga acaacaagtg  1260
atccaacgaa tcgtcgttcg ggctgacttt ggcatgaata tggcccacga tttcatggat  1320
gacctgacca aggctgtcca tgacttaaac cacgcccaca ttgtctatca tcatgacgcg  1380
gcacctaaga aataccctatt cacacactga                                   1410

SEQ ID NO: 13          moltype = DNA   length = 27
FEATURE                Location/Qualifiers
source                 1..27
                       mol_type = other DNA
                       organism = synthetic construct
SEQUENCE: 13
atggcaatgt tataccggtaa acacaat                                        27

SEQ ID NO: 14          moltype = DNA   length = 27
FEATURE                Location/Qualifiers
source                 1..27
                       mol_type = other DNA
                       organism = synthetic construct
SEQUENCE: 14
cttaggaaga tcatgttgtt cgcgagg                                         27

SEQ ID NO: 15          moltype = DNA   length = 27
FEATURE                Location/Qualifiers
source                 1..27
                       mol_type = other DNA
                       organism = synthetic construct
SEQUENCE: 15
ggtgcgcctc gcgaacaaca tgatctt                                         27

SEQ ID NO: 16          moltype = DNA   length = 27
FEATURE                Location/Qualifiers
source                 1..27
                       mol_type = other DNA
                       organism = synthetic construct
SEQUENCE: 16
tcagatttcc ggatggcatt ctttcgc                                         27
```

-continued

```
SEQ ID NO: 17            moltype = DNA   length = 27
FEATURE                  Location/Qualifiers
source                   1..27
                         mol_type = other DNA
                         organism = synthetic construct
SEQUENCE: 17
tgccatccgg aaatctgagt acccccg                                               27

SEQ ID NO: 18            moltype = DNA   length = 27
FEATURE                  Location/Qualifiers
source                   1..27
                         mol_type = other DNA
                         organism = synthetic construct
SEQUENCE: 18
cattgcttta ccgcctaaca tacaagc                                               27

SEQ ID NO: 19            moltype = DNA   length = 27
FEATURE                  Location/Qualifiers
source                   1..27
                         mol_type = other DNA
                         organism = synthetic construct
SEQUENCE: 19
aggcggtaaa gcaatgaaat tcgcctg                                               27

SEQ ID NO: 20            moltype = DNA   length = 27
FEATURE                  Location/Qualifiers
source                   1..27
                         mol_type = other DNA
                         organism = synthetic construct
SEQUENCE: 20
aaacttacgc cagcaaactt gatagcc                                               27

SEQ ID NO: 21            moltype = DNA   length = 27
FEATURE                  Location/Qualifiers
source                   1..27
                         mol_type = other DNA
                         organism = synthetic construct
SEQUENCE: 21
ttgctggcgt aagttttgtg tctactg                                               27

SEQ ID NO: 22            moltype = DNA   length = 27
FEATURE                  Location/Qualifiers
source                   1..27
                         mol_type = other DNA
                         organism = synthetic construct
SEQUENCE: 22
taagacacgg ttaacgtcaa ggaccat                                               27

SEQ ID NO: 23            moltype = DNA   length = 27
FEATURE                  Location/Qualifiers
source                   1..27
                         mol_type = other DNA
                         organism = synthetic construct
SEQUENCE: 23
gttaaccgtg tcttagacta cgtggac                                               27

SEQ ID NO: 24            moltype = DNA   length = 27
FEATURE                  Location/Qualifiers
source                   1..27
                         mol_type = other DNA
                         organism = synthetic construct
SEQUENCE: 24
atcgagtttg gctaggtcgt catattg                                               27

SEQ ID NO: 25            moltype = DNA   length = 27
FEATURE                  Location/Qualifiers
source                   1..27
                         mol_type = other DNA
                         organism = synthetic construct
SEQUENCE: 25
ctagccaaac tcgataaggt cgttact                                               27

SEQ ID NO: 26            moltype = DNA   length = 27
FEATURE                  Location/Qualifiers
source                   1..27
                         mol_type = other DNA
                         organism = synthetic construct
SEQUENCE: 26
cccacctaat ttactaactt tgaagac                                               27
```

```
SEQ ID NO: 27          moltype = DNA  length = 27
FEATURE                Location/Qualifiers
source                 1..27
                       mol_type = other DNA
                       organism = synthetic construct
SEQUENCE: 27
aaagttagta aattaggtgg ggagttg                                         27

SEQ ID NO: 28          moltype = DNA  length = 27
FEATURE                Location/Qualifiers
source                 1..27
                       mol_type = other DNA
                       organism = synthetic construct
SEQUENCE: 28
cagagcgcgt gccaggtagc gggcaac                                         27

SEQ ID NO: 29          moltype = DNA  length = 27
FEATURE                Location/Qualifiers
source                 1..27
                       mol_type = other DNA
                       organism = synthetic construct
SEQUENCE: 29
ctggcacgcg ctctggataa agttggt                                         27

SEQ ID NO: 30          moltype = DNA  length = 27
FEATURE                Location/Qualifiers
source                 1..27
                       mol_type = other DNA
                       organism = synthetic construct
SEQUENCE: 30
ttgttgtttc agattagcag ggaaagg                                         27

SEQ ID NO: 31          moltype = DNA  length = 27
FEATURE                Location/Qualifiers
source                 1..27
                       mol_type = other DNA
                       organism = synthetic construct
SEQUENCE: 31
aatctgaaac aacaagtcat ccaacga                                         27

SEQ ID NO: 32          moltype = DNA  length = 27
FEATURE                Location/Qualifiers
source                 1..27
                       mol_type = other DNA
                       organism = synthetic construct
SEQUENCE: 32
tcagtgtgtg aataggtatt tcttagg                                         27
```